US011669817B2

(12) United States Patent
Walters et al.

(10) Patent No.: US 11,669,817 B2
(45) Date of Patent: Jun. 6, 2023

(54) METHODS AND DEVICES FOR SUBSCRIPTION OFFERINGS (71) Applicant: Capital One Services, LLC, McLean, VA (US)

(72) Inventors: Austin Walters, Savoy, IL (US); Jeremy Edward Goodsitt, Champaign, IL (US); Galen Rafferty, Mahomet, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 383 days.

(21) Appl. No.: 16/823,222

(22) Filed: Mar. 18, 2020

(65) Prior Publication Data
US 2021/0295292 A1    Sep. 23, 2021

(51) Int. Cl.
G06Q 20/12         (2012.01)
G06Q 30/02         (2023.01)
G06Q 30/06         (2023.01)
G06Q 30/0202       (2023.01)
G06Q 40/04         (2012.01)
G06Q 20/10         (2012.01)
G06Q 30/0601       (2023.01)
G06F 21/60         (2013.01)
H04L 9/06          (2006.01)
G06Q 30/04         (2012.01)

(52) U.S. Cl.
CPC ......... G06Q 20/127 (2013.01); G06F 21/602 (2013.01); G06Q 20/108 (2013.01); G06Q 30/0202 (2013.01); G06Q 30/04 (2013.01); G06Q 30/0623 (2013.01); G06Q 30/0631 (2013.01); G06Q 40/04 (2013.01); H04L 9/0643 (2013.01); G06Q 2220/00 (2013.01)

(58) Field of Classification Search
None
See application file for complete search history.

(56) References Cited

U.S. PATENT DOCUMENTS

| 6,415,262 | B1 * | 7/2002 | Walker | G06Q 30/0226 |
| | | | | 705/14.27 |
| 7,580,856 | B1 * | 8/2009 | Pliha | G06Q 20/10 |
| | | | | 235/382 |
| 10,079,872 | B1 * | 9/2018 | Thomas | H04M 15/80 |
| 2007/0136113 | A1 * | 6/2007 | Wilson | G06Q 30/02 |
| | | | | 705/59 |

(Continued)

Primary Examiner — Jamie H Austin
(74) Attorney, Agent, or Firm — Troutman Pepper Hamilton Sanders LLP; Christopher J. Forstner; John A. Morrissett (57) ABSTRACT Methods and devices for subscription offerings are disclosed. The device determines a set of subscription-based applications stored on the device and for each of the subscription-based applications, determines a service type. The device then determines a first subscription service to offer the user of the device via a graphical user interface of the device. After receiving acceptance of the offer for the first subscription service from the user, the device automatically establishes a customer account for the first subscription service. Then, the device downloads a first subscription service application, generates login information for the customer account, and performs a login to the customer account with the login information.

11 Claims, 6 Drawing Sheets (56) References Cited

U.S. PATENT DOCUMENTS

| | | | | |
|---|---|---|---|---|
| 2009/0070185 | A1* | 3/2009 | Farrelly | G06Q 30/0601 |
| | | | | 705/26.7 |
| 2010/0057485 | A1* | 3/2010 | Luft | H04W 4/00 |
| | | | | 709/224 |
| 2016/0092815 | A1* | 3/2016 | Hunter | G06Q 10/06313 |
| | | | | 705/7.23 |
| 2016/0162923 | A1* | 6/2016 | Meier | G06Q 30/0242 |
| | | | | 705/14.16 |
| 2018/0276724 | A1* | 9/2018 | Van Erlach | G06Q 30/0283 |
| 2021/0125254 | A1* | 4/2021 | O'Neill | G06Q 30/0282 |
| 2021/0295292 | A1* | 9/2021 | Walters | G06Q 30/04 |

* cited by examiner

METHODS AND DEVICES FOR SUBSCRIPTION OFFERINGS

FIELD

Examples of the present disclosure relate to methods and devices for subscription offerings, and more particularly to methods and devices for identifying and offering customer-specific subscription services and securely and automatically creating accounts for the customer-specific subscription services.

BACKGROUND

Increased popularity in smart devices (e.g., smartphones, smart televisions, smart watches, etc.) allows users to receive various subscription services in a myriad of ways. Customers can view live television on their smartphones, for example, via numerous streaming services. Identifying the subscription service that best fits one's needs, however, can be time-consuming and difficult, especially for technologically unsophisticated customers. For customers with multiple subscription services, keeping track of multiple login credentials can also prove difficult. Further, each time an account is created by the customer potentially sensitive data may be exposed on the Internet. From the perspective of a service provider, processing each individual subscription account can also be burdensome. Service providers may have difficulty collecting payment, for example, when a customer's account information changes (e.g., they get a replacement credit card).

Accordingly, there is a need for methods and devices that proactively identify and offer customer-specific subscription services and securely and automatically create accounts and configure payment for the customer-specific subscription services using customer account data. Examples of the present disclosure are directed to this and other considerations.

SUMMARY

Examples of the present disclosure comprise methods and devices for subscription offerings. The method can include retrieving customer data by a transceiver associated with a financial institution. The customer data can include customer transactions for a plurality of customers. The method can also include identifying, by a processor of the financial institution, a first subscription service based on a merchant identifier included in the customer data. The method can also calculate a number of current subscriptions for the first subscription service, which can be used to determine a number of bulk subscriptions for the first subscription service to purchase. Then, the method can include purchasing the number of bulk subscriptions from a server of the first subscription service.

The financial institution can then offer the first subscription service to a first customer based on customer data (e.g., what subscription services they have). In turn, the first customer can send an acceptance to the financial institution. Once the financial institution receives the acceptance from the first customer, the method can include retrieving information for a first account for the first customer from the customer data. The method can then include receiving payment for the first subscription service from the first account. Next, a first account for the first subscription service can be established for the first customer with the server of the first subscription service. The method can further include generating login information for the first account and sending, with a transceiver, the login information to the first user device. In some examples, the login information can be encrypted in a hashed data type format prior to sending the login information to the first user device.

Further features of the disclosed design, and the advantages offered thereby, are explained in greater detail hereinafter with reference to specific examples illustrated in the accompanying drawings, wherein like elements are indicated be like reference designators.

BRIEF DESCRIPTION OF THE DRAWINGS

Reference will now be made to the accompanying drawings, which are not necessarily drawn to scale, are incorporated into, and constitute a portion of, this disclosure, illustrate various implementations and aspects of the disclosed technology and, together with the description, serve to explain the principles of the disclosed technology. In the drawings.

DETAILED DESCRIPTION

Examples of the present disclosure relate to methods and devices for providing subscription offerings. The user device (e.g., smartphone) can determine that a set of subscription-based applications are stored on the user device. The user device can then determine a service type for each of the applications in the set. The user device can determine a first subscription service to offer a user of the user device. The user device can display an offer for the first subscription service on a first graphical user interface (GUI). In response, the user device can receive an acceptance of the offer for the first subscription service from the user. The user device can then establish a customer account with a server of a merchant associated with the first subscription service and can download a first subscription service application from the server. The user device can also generate login information for the customer account and log the user into the first subscription service application using the login information.

Some implementations of the disclosed technology will be described more fully with reference to the accompanying drawings. The disclosed technology, however, may be embodied in many different forms and should not be construed as limited to the implementations set forth herein. The components described hereinafter as making up various elements of the disclosed technology are intended to be illustrative and not restrictive. Many suitable components that could perform the same or similar functions as components described herein are intended to be embraced within the scope of the disclosed systems and methods. Such other components not described herein may include, but are not limited to, for example, components developed after development of the disclosed technology.

It is also to be understood that the mention of one or more method steps does not imply a particular order of operation or preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to example examples of the disclosed technology, examples of which are illustrated in the accompanying drawings and disclosed herein. Wherever convenient, the same references numbers will be used throughout the drawings to refer to the same or like parts.

Figure 1:
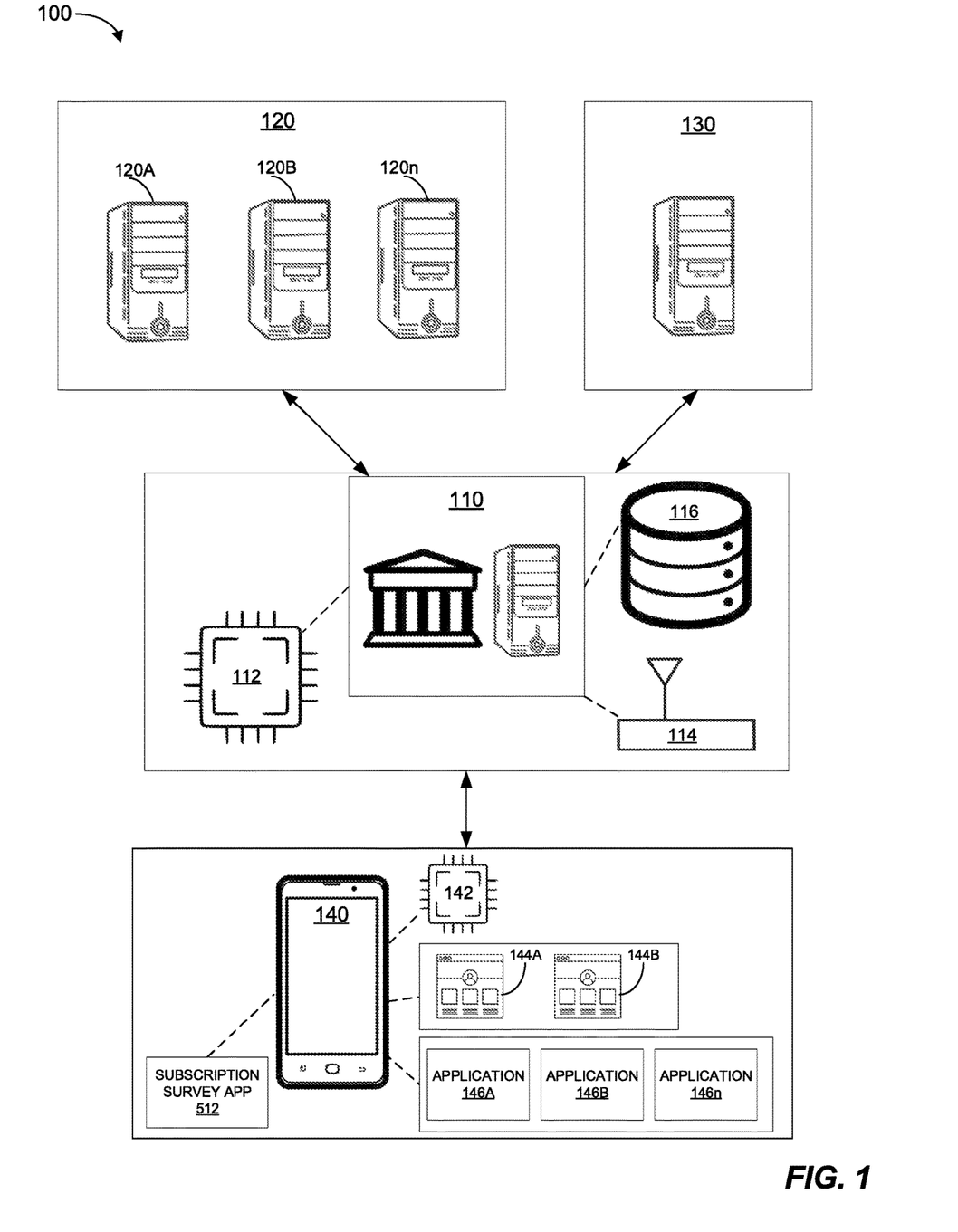
FIG. 1 is a diagram of an example of a system that may be used to implement one or more examples of the present disclosure.

FIG. 1 shows an example of a system 100 that may implement certain methods for providing subscription offerings as disclosed herein. As shown in FIG. 1, the system 100 can include one or more subscription service servers 120A-120n, an external server 130, a user device 140, and a financial institution server 110. The financial institution server 110 may include one or more processors 112, a transceiver 114, and a database 116, among other things. The user device 140 can include one or more processors 142, a first graphical user interface (GUI) 144A, a second graphical user interface (GUI) 144B, and one or more applications 146A— n. The subscription service servers 120A-120n may belong to various service providers (e.g., internet service providers, streaming service providers, utility service providers, etc.). The external server 130 may belong to another financial institution, credit agency, an electronic payment system (EPS), or a third-party aggregator, for example, that stores customer data from various financial institutions, merchants, social media, etc. The external server 130 may automatically process certain customer payments including recurring bills (e.g., water bill, power bill, etc.) without the use of a physical device—i.e., by accessing a payment method provided by the customer (e.g., debit card number, bank account number, etc.).

The user device 140 can be, for example, a personal computer, a smartphone, a smart television (TV), a laptop computer, a tablet, a wearable device (e.g., smart watch, smart jewelry, head-mounted displays, etc.), or other computing device. An example computer architecture that can be used to implement the user device 140 is described below with reference to FIG. 5. The financial institution server 110 can include one or more physical or logical devices (e.g., servers) or drives and may be implemented as a single server, a bank of servers (e.g., in a "cloud"), run on a local machine, or run on a remote server. An example computer architecture that can be used to implement the financial institution server 110 is described below with reference to FIG. 6.

To provide subscription offerings, the financial institution server 110 can retrieve customer data from database 116, which can include a plurality of customer transactions for a plurality of customers. Thus, the customer data can include the customer transactions involving, for example, a credit card, debit card, or a bank account of the financial institution. Each transaction can include a merchant identifier, among other data, which can be used to identify one or more subscription services. A merchant identifier of "NFLX114," for example, may be associated with Netflix®, which can be used to determine that the customer subscribes to Netflix®.

Using data for all (or a subset) of customers of the financial institution, the financial institution server 110 can calculate the number of current subscriptions for the first subscription service. Based on the number of current subscriptions for the first subscription service, the financial institution server 110 can determine a number of bulk subscriptions to purchase. In some cases, the number of bulk subscriptions to purchase can be a percentage of the number of current subscriptions (e.g., 100%, 80%, 50%, 25%). The financial institution server 110 can also determine a growth rate (i.e., a percentage increase of the number of current subscriptions over a predetermined time) and a decay rate (i.e., a percentage decrease of the number of current subscriptions over a predetermined time). In some cases, the number of bulk subscriptions to purchase can be based on the growth rate, the decay rate, and/or a comparison of the growth rate to the decay rate. The financial institution server 110 can retrieve historical customer data from database 116, for example, or can receive historical customer data from the external server 130 to determine a growth rate for the first subscription service. The growth rate can be a comparison of the number of previous subscriptions for the first subscription service to the number of current subscriptions first subscription service over a predetermined amount of time.

The financial institution server 110 can then purchase the calculated number of bulk subscriptions from a server of the first subscription service (e.g., first subscription service server 120A). Next, the financial institution server 110 can identify a first customer to which to offer the first subscription service. Identifying the first customer can include identifying a first subscription type (e.g., streaming television service) for the first subscription service, determining a set of customers having a subscription with a second subscription service of the first subscription type (e.g., with a different provider), and then selecting the first customer from the set of customers. Identifying the first subscription type can involve using transaction embedding, merchant metadata, and/or a curated service to group subscription services. As a practical example, this could involve identifying customers that have Netflix® but not Hulu®, and then offering Hulu® to one of the customers. In other cases, identifying the first customer can involve identifying the first subscription type for the first subscription service and then determining from the customer data that the first customer is not subscribed to any subscription services of the first subscription type.

Once the first customer is identified, the financial institution server 110 can send an offer for the first subscription service to the user device 140 associated with the first customer. In some cases, sending the offer can include generating a graph that highlights the differences between the first subscription service and the second subscription service. Then, the financial institution server 110 can send the graph to the user device 140 to cause the user device 140 to display the graph. When the user accepts the offer, the financial institution server 110 can receive the acceptance from the user device 140.

After receiving acceptance of the offer from the user device 140, the financial institution server 110 can retrieve information for a first account (e.g., a credit card) for the first customer from the customer data. The financial institution server 110 can then receive payment for the first subscription service from the first account. In some cases, this can involve the financial institution server 110 submitting a payment request to the external server 130. In other cases, such as when the financial institution server 110 belongs to the customer's bank, the payment can be extracted from the first account using an automated clearing house (ACH) transactions or other direct/internal method. The financial institution server 110 can also establish a first account for the first customer with the first subscription service. To do so, the financial institution server 110 may send a request to establish the first account with the first subscription service server 120A, which can include customer information such as first and last name, address, and date of birth, among other things. The financial institution server 110 can also generate login information (e.g., a username and password) for the first account and send the login information to the user device 140. In some cases, prior to sending the login information, the financial institution server 110 can encrypt the login information in hashed data type format (or other suitably secure format). Also, the financial institution server 110 can send a clickable web link to the user device 140 that, when clicked, causes the user device 140 to download a first subscription service application associated with the first subscription service.

Turning to the user device 140, as mentioned above, the user device 140 can communicate with the financial institution server 110 to receive a subscription service offer and, if accepted, the first subscription service. The user device 140 can also perform several of the same or similar features as the financial institution server 110. The user device 140 can use a subscription survey app 512 (described in more detail below), for example, to determine which subscription service(s) to add to the user device. The subscription survey app 512 can determine a set of subscription-based applications from the one or more applications 146A-n stored on the user device 140. The user device 140 can also determine a service type (e.g., utility service, internet service provider, streaming television service) for each of the subscription-based applications in the set.

The user device 140 can then determine the first subscription service to offer the user of the user device 140 based on the subscription services already on the user device 140. In some examples, this can be accomplished by identifying that the set of subscription-based applications does not include a certain service type. In other examples, this can involve identifying a similar subscription service, i.e., a subscription service having the same service type with a different provider. The user device 140 can offer the user the first subscription service in various ways, for example, the user device 140 can display, on the first GUI 144A, an offer for the first subscription service to the user. The offer can include a first graph that illustrates the service features and prices for each of the subscription-based applications that are in the same service type as the first subscription service. The user device 140 can also compare the price and/or service features of each of the subscription-based applications to generate a second graph that highlights the differences for display on the second GUI 144B. In some cases, the offer can also take the form of a push notification. In turn, the first GUI 144A or the second GUI 144B can receive an acceptance of the offer from the user.

Next, the user device 140 can communicate with the first subscription service server 120A to establish a customer account for the first customer. This can include the user device 140 generating login information (e.g., a username and password) for the customer account. In some cases, the user device 140 can send biometric data (e.g., fingerprint data, face recognition data, optical data, etc.) to the first subscription service server 120A for use as the login information. The biometric data can be retrieved from memory or can be received from the user after prompting the user to submit biometric data. In some cases, the prompt can include a choice of which biometric data the user wishes to submit.

The user device 140 can download the first subscription service application to provide access to the first subscription service. The user device 140 can do so by downloading the first subscription service application from an app store or from a website. In some cases, the user may be prompted for permission to download the first subscription service application. Next, the user device 140 can submit the login information to log the user in to the first subscription service application. In some examples, the user device 140 can encrypt the login information (e.g., in a hashed data type format) and send the encrypted login information to a user address (e.g., email address, phone number, etc.) for future reference by the user.

Figure 2:
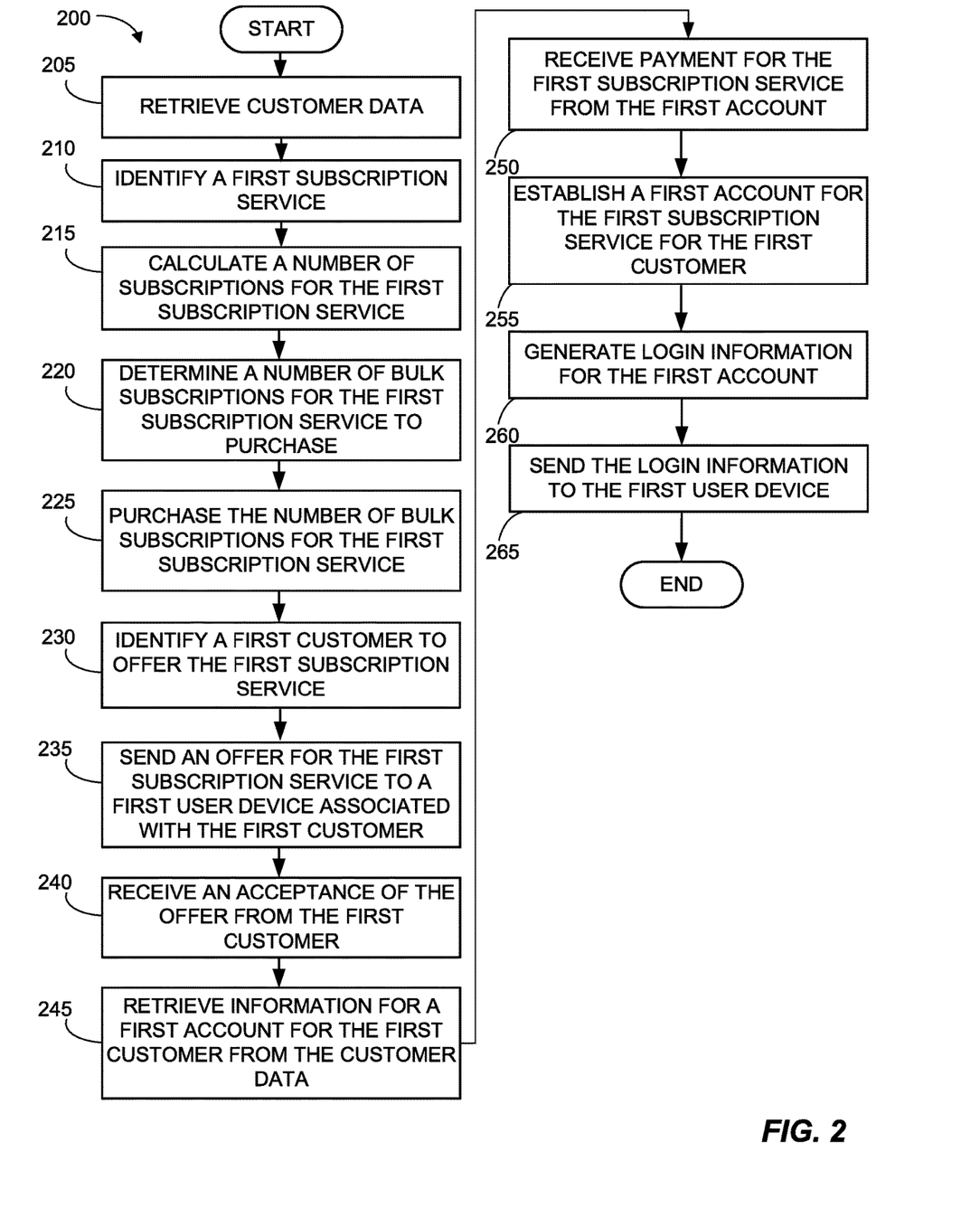
FIG. 2 is a flowchart of an example of a method for a financial institution server to provide subscription offerings, in accordance with some examples of the present disclosure.

FIG. 2 is a flowchart of an example of a method 200 for providing subscription offerings from the perspective of the financial institution server 110. And while shown from this perspective for the sake of clarity, the method 200, or a substantially similar method, can be performed by the financial institution server 110, the user device 140, the external server 130, the subscription service servers 120A-120n, or any combination thereof. The financial institution server 110 may be in communication, for example, with the user device 140, the subscription service servers 120A-120n, and the external server 130. In some examples, the financial institution server 110 may store the customer data or receive customer data from the external server 130, identify a first subscription service for a customer, send the customer an offer for the first subscription service, and upon receiving customer approval, establish a customer account with the first subscription service including login information.

At 205, the financial institution server 110 can retrieve customer data, which can be stored in the database 116 and/or received from the external server 130. In some examples, the customer data can be an aggregate of customer transactions for a plurality of customers. At 210, the financial institution server 110 can identify a first subscription service from the customer data. In some examples, this can be achieved by parsing the customer data to identify one or more common merchant identifiers.

The financial institution server 110 can determine which of the one or more merchant identifiers are associated with a subscription-based service. This can be performed, for example, by looking up the merchant identifier in a stored table that contains fields for the merchant identifier, the merchant, the service type and/or whether the service is subscription-based. At 215, the financial institution server 110 can calculate a number of current subscriptions customers have for the first subscription service. At 220, the method can include the financial institution server 110 determining a number of bulk subscriptions for the first subscription service to purchase based on, for example, the current number of customers with the first subscription service, the growth rate of the first subscription service, the cost of the first subscription service, or other factors.

At 225, the financial institution server 110 can purchase the appropriate number of bulk subscriptions from the first subscription service server 120A. As with any large transaction, purchasing the subscriptions in bulk can help reduce the overall transaction cost to both the financial institution and the subscription service providers, which can provide a profit to the financial institution and/or reduce the cost to the customer. Further, purchasing subscriptions in bulk can reduce the load on the subscription service servers 120A-120n, which reduces the processing power and number of servers required.

At 230, the financial institution server 110 can identify a first customer to offer the first subscription service. In some examples, the financial institution server 110 can identify customers with a subscription to a service of the same service type as the first subscription service, but with a different provider (i.e., identifying customers with a competing service). In other examples, the financial institution server 110 can identify customers that have no subscriptions with any service that is the same service type as the first subscription service. At 235, the financial institution server 110 can send an offer for the first subscription service to the user device 140 of the first customer. The offer can include instructions that cause the user device 140 to display the offer, which can include, for example, one or more graphs that illustrate the services and features provided by the first subscription service and/or a comparison of the services and features provided by multiple subscription services. The financial institution server 110 can send the offer via a user address (e.g., email address, phone number, device information) or other contact information for the first customer retrieved from the customer data. At 240, when the first customer accepts the offer, the financial institution server 110 can receive an acceptance of the offer (e.g., a text message, e-mail, or push notification) from the user device 140.

At 245, the financial institution server 110 can retrieve payment data for a first account (e.g., a bank account or credit card) associated with the first customer. At 250, when the first account is with the financial institution, the financial institution server 110 can deduct payment directly from the first customer's account. Otherwise, the financial institution server 110 can request payment from a server (e.g., external server 130) associated with the first customer's account. At 255, upon successful receipt of payment, the financial institution server 110 can establish a customer account for the first customer with the first subscription service by sending certain customer information for the first customer such as, for example, first and last name, address, and date of birth (e.g., for parental control purposes) to the first subscription service server 120A. At 260, the financial institution server 110 can generate login information for the customer account. Finally, at 265, the login information can be sent to the user device 140 associated with the first customer.

Figure 3:
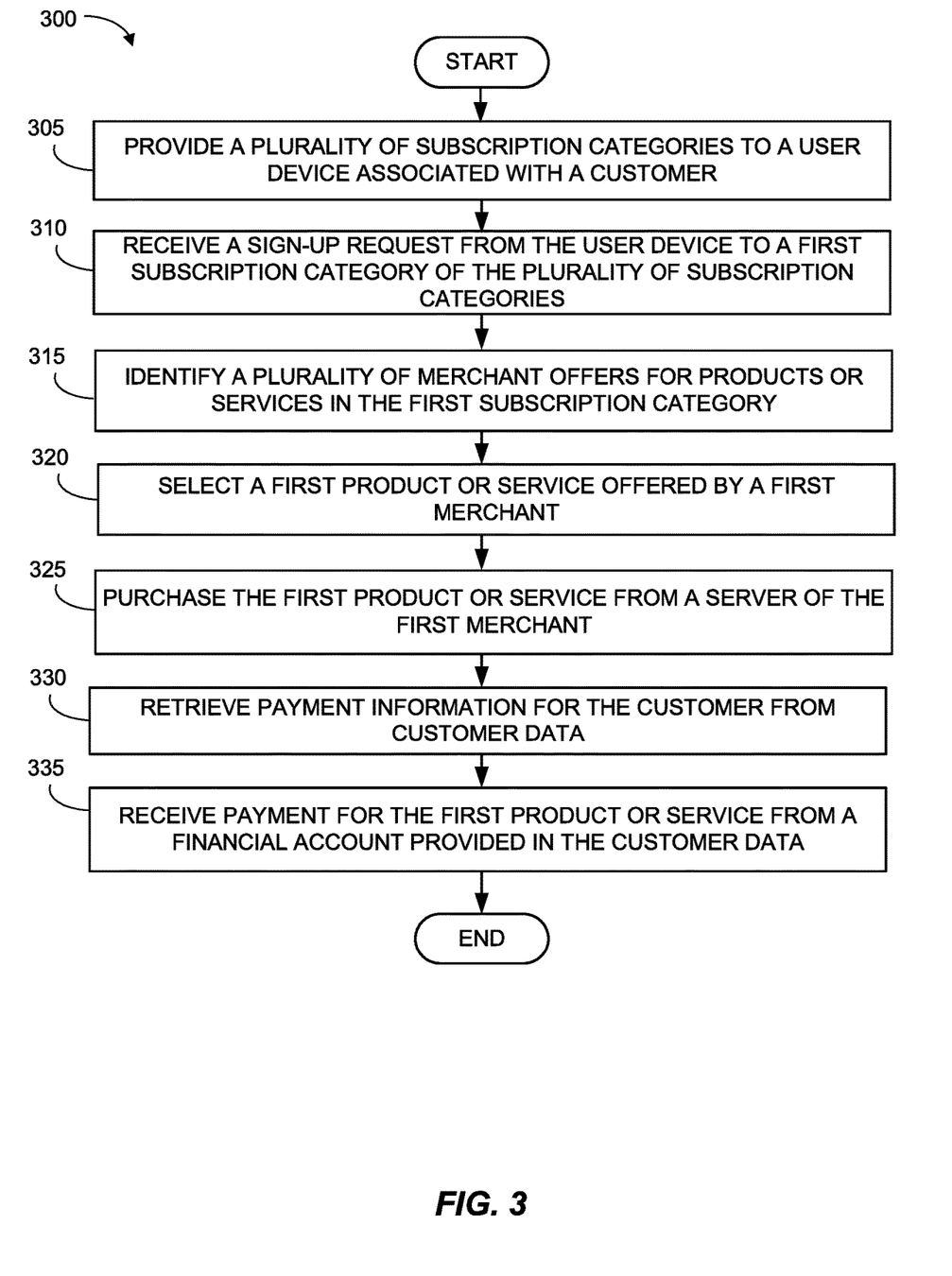
FIG. 3 is a flowchart of another example of a method for the financial institution server to provide subscription offerings, in accordance with some examples of the present disclosure.

FIG. 3 depicts a flowchart of a method for providing subscription offerings based on user-selected subscription categories, and subsequent selection of a subscription service and collection of payment by the financial institution server 110 for the selected subscription service. The financial institution server 110 can retrieve customer data from memory (e.g., database 116) and/or can receive customer data from the external server 130. Further, the financial institution server 110 can identify and retrieve individual payment information from customer data.

At 305, the financial institution server 110 can provide a plurality of subscription categories (e.g., utility service, streaming television service, or internet service provider) to a customer via the user device 140. In some cases, this can include the financial institution server 110 generating a summary of the plurality of subscription categories that can be depicted as a first graph. Further, when the financial institution server 110 sends the summary to the user device 140, the summary can include instructions that causes the user device 140 to display the summary on the first GUI 144A and/or the second GUI 144B. At 310, the financial institution server 110 can receive a sign-up request that can includes a first subscription category (e.g., streaming television service) of the plurality of subscription categories from the user device 140. In some cases, before proceeding with the sign-up request, the financial institution server 110 can compare the price and/or the features of each of the products or services in the first subscription category to identify any differences, which the financial institution server 110 can use to generate a second graph that is sent to the user device 140 to cause the user device 140 to display the second graph in the first GUI 144A and/or the second GUI 144B.

Then, at 315, the financial institution server 110 can identify a plurality of merchant offers for products or services in the first subscription category. This can involve receiving merchant data from one or more of the subscription service servers 120A-120n, which can include the respective merchant offer.

At 320, the financial institution server 110 can select a first product or service offered by a first merchant (e.g., first subscription service server 120A), which can include selecting the lowest priced product or service in the first subscription category. In some cases, the financial institution server 110 can further select the first product or service based on peer data, i.e., customer ratings of the products or services in the first subscription category. The customer ratings can be an aggregate of customer reviews collected by the financial institution server 110 from across the Internet or the financial institution server 110 can receive the customer rating from a central source (e.g., the external server 130). In other cases, selecting the first product or service can involve the financial institution server 110 receiving a user selection of the first product or service from the user device 140, which can be received in response to receipt of the second graph.

The financial institution server 110, at 325, can purchase the first product or service from the first subscription service server 120A. In other words, the financial institution server 110 can purchase the first product or service on the customer's behalf. At 330, the financial institution server 110 can retrieve the customer's payment information from customer data, which, at 335, can be used to receive payment from a financial account (e.g., credit card) of the customer.

When the first product or service is a service, the financial institution server 110 can also establish a customer account for a first service. To do so, the financial institution server 110 can send a request to the first subscription service server 120A to establish the customer account, which can include customer information (e.g., first and last name, mailing address, billing address, social security number, etc.). After receiving a confirmation from the first subscription service server 120A that the customer account has been successfully created, the financial institution server 110 can generate login information for the customer account that can be sent to the user device 140. In some cases, the financial institution server 110 can encrypt the login information before sending to the user device 140.

Figure 4:
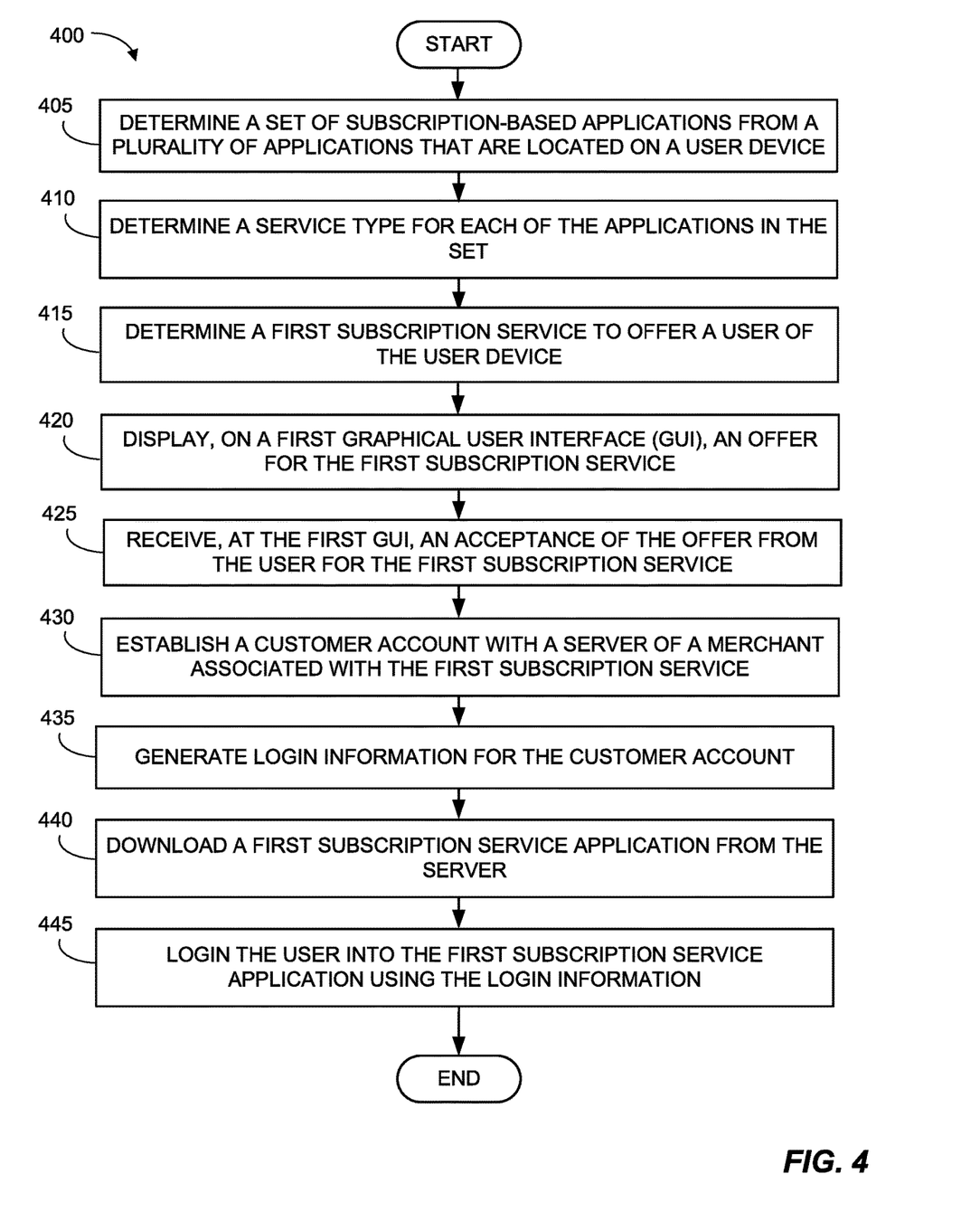
FIG. 4 is a flowchart of an example of a method for receiving subscription offerings on a user device, in accordance with some examples of the present disclosure.

FIG. 4 is a flowchart of an example of a method 400 for providing subscription offerings from the perspective of the user device 140. The method 400 can be performed primarily by the user device 140 that can be in communication with the financial institution server 110, the subscription service servers 120A-120n, the external server 130, or any combination thereof. Therefore, the user device 140 can recommend and automatically download a subscription-based application, establish a customer account for the subscription-based application, and then generate login information for the customer account.

At 405, the user device 140 can determine a set of subscription-based applications from the one or more applications 146A-n stored on the user device 140. The user device 140 can distinguish subscription-based applications, for example, based on payment information associated with a recurring payment for a product or service associated with one of the one or more applications 146A-n. At 410, the user device 140 can determine a service type (e.g., dating service) for each of the subscription-based applications. At 415, the user device 140 can determine a first subscription service to offer a user of the user device 140. In some cases, the first subscription service can be a service type not found on the user device 140, for example, the user device 140 can identify that the user device 140 lacks an application of a streaming television service type and then offer an application such as Hulu® to the user. In cases where the user device 140 identifies multiple applications of the same service type to potentially offer the user, the user device 140 can further select the application to offer based on associated service features (e.g., channels, price, availability within the user's geographic region). In other cases, the user device 140 can determine the first subscription service to offer based on service types found on the user device 140, for example, because the user device 140 has a plurality of dating applications, the user device 140 identifies a dating application not found on the user device 140 to offer the user.

Then, at 420, the user device 140 can display the offer for the first subscription service on the first GUI 144A. The offer can include a first graph that illustrates the service features and prices for the first subscription service. In some cases, the offer can include a second graph displayed on the second GUI 144B that includes highlighted price differences and/or service feature differences between the first subscription service and the set of subscription-based applications. At 425, the user device 140 can receive, for example, at the first GUI 144A an acceptance of the offer for the first subscription service from the user. After the user accepts the offer for the first subscription service, the user device 140 can establish a customer account with the merchant providing the first subscription service (e.g., the first subscription service server 120A) in a manner the same or similar to that disclosed above.

At 435, the user device 140 can generate login information (e.g., username and password) for the customer. Then, the user device 140 can download, at 440, a first subscription service application from the first subscription service server 120A or from an app store (e.g., Google Play®). Also, at 445, the user device 140 can login the user into the first subscription service application using the login information. In some cases, the user device 140 can encrypt the login information in a hashed data type format and send the encrypted login information to a user address (e.g., email address). The user device 140 can also be configured to remit automatic payment for the first subscription service. When granted user permission, the user device 140 can retrieve payment information from storage on the user device 140, or the user device 140 can prompt the user for the payment information. The payment information can then be transmitted to the first subscription service server 120A along with user preferences (e.g., for monthly payments, a scheduled date in the month to request payment).

Figure 5:
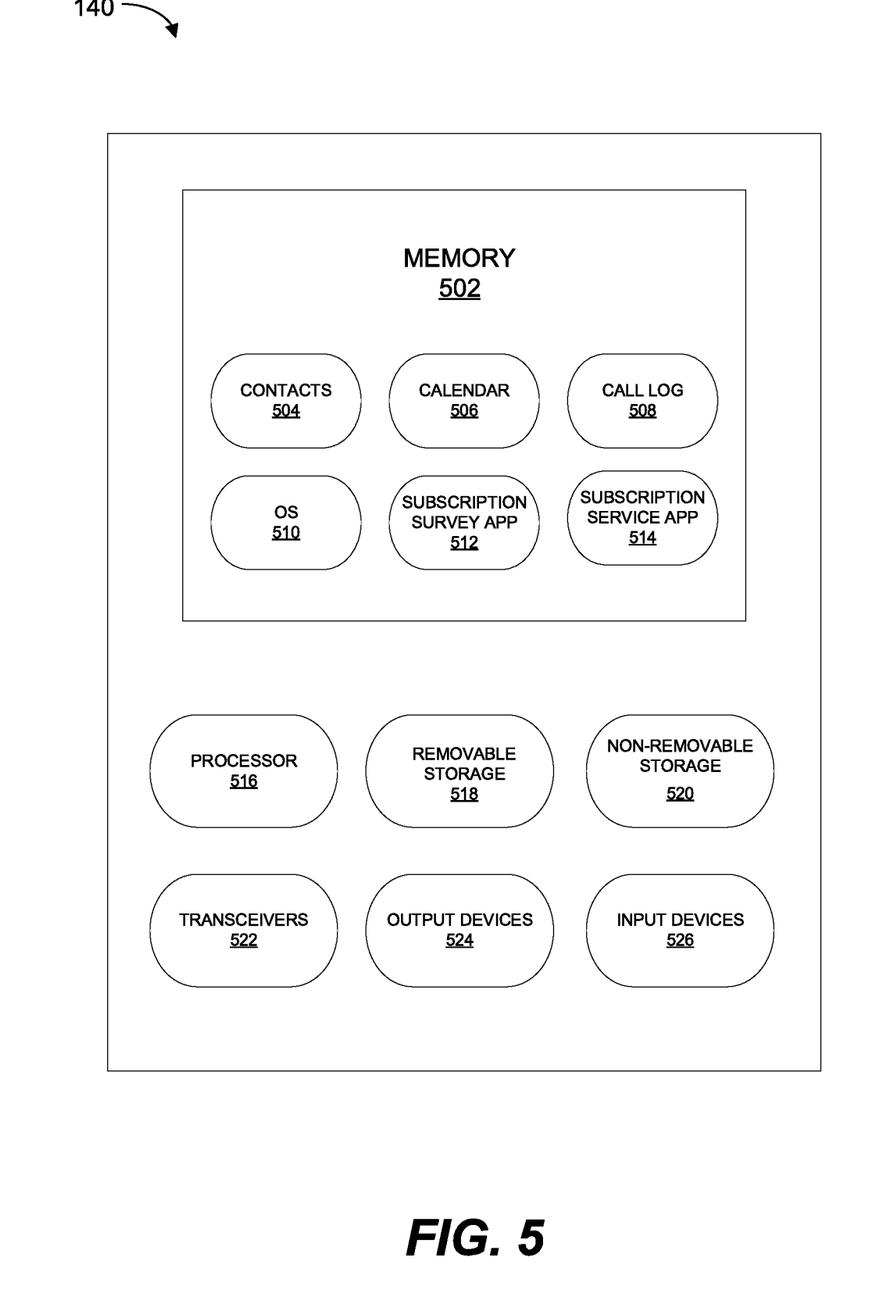
FIG. 5 is a component diagram of an example of a user device, in accordance with some examples of the present disclosure.

As shown in FIG. 5, some, or all, of the system 100 and methods 200, 300 and 400 can be performed by, and/or in conjunction with, the user device 140. In some examples, the user device 140 can comprise, for example, a cell phone, a smart phone, a smart television, a tablet computer, a laptop computer, a desktop computer, a server, or other electronic device. The user device 140 may be a single server, for example, or may be configured as a distributed, or "cloud," computer system including multiple servers or computers that interoperate to perform one or more of the processes and functionalities associated with the disclosed examples. One of skill in the art will recognize, however, that the system 100 and methods 200, 300 and 400 can also be used with a variety of other electronic devices, such as, for example, tablet computers, laptops, desktops, and other network (e.g., cellular or internet protocol (IP) network) connected devices from which a call may be placed, a text may be sent, and/or data may be received. These devices are referred to collectively herein as the user device 140. The user device 140 can comprise a number of components to execute the above-mentioned functions and apps. As discussed below, the user device 140 comprise memory 502 including many common features such as, for example, contacts 504, a calendar 506, a call log (or, call history) 508, and operating system (OS) 510. In this case, the memory 502 can also store a subscription survey app 512 and a subscription service app 514.

The user device 140 can also comprise one or more processors 516. In some implementations, the processor(s) 516 can be a central processing unit (CPU), a graphics processing unit (GPU), or both CPU and GPU, or any other sort of processing unit. The user device 140 can also include one or more of removable storage 518, non-removable storage 520, one or more transceiver(s) 522, output device(s) 524, and input device(s) 526.

In various implementations, the memory 502 can be volatile (such as random-access memory (RAM)), non-volatile (such as read only memory (ROM), flash memory, etc.), or some combination of the two. The memory 502 can include all, or part, of the functions 504, 506, 508, 512, 514, and the OS 510 for the user device 140, among other things.

The memory 502 can also comprise contacts 504, which can include names, numbers, addresses, and other information about the user's business and personal acquaintances, among other things. In some examples, the memory 502 may also include a calendar 506, or other software, to enable the user to track appointments and calls, schedule meetings, and provide similar functions. In some examples, the memory 502 can also comprise the call log 508 of calls received, missed, and placed from the user device 140. As usual, the call log 508 can include timestamps for each call for use by the system 100. Of course, the memory 502 can also include other software such as, for example, e-mail, text messaging, social media, and utilities (e.g., calculators, clocks, compasses, etc.).

The memory 502 can also include the OS 510. Of course, the OS 510 varies depending on the manufacturer of the user device 140 and currently comprises, for example, iOS 13.3.1 for Apple products and Pie for Android products. The OS 510 contains the modules and software that supports a computer's basic functions, such as scheduling tasks, executing applications, and controlling peripherals.

As mentioned above, the user device 140 can also include the subscription survey app 512. The subscription survey app 512 can perform some, or all, of the functions discussed above with respect to the methods 200, 300 and 400 for interactions occurring between the user device 140, the financial institution server 110, and the first subscription service server 120A. Thus, the subscription survey app 512 can identify the plurality of applications (e.g., applications 126A—n) stored on the user device and the corresponding service type of each of the plurality of applications. The subscription survey app 512 can then identity a first subscription service to offer, offer the first subscription service, and upon acceptance of the offer, the subscription survey app 512 can cause the user device 140 to download subscription service app 514.

The subscription service app 514 can be any subscription-based application that can communicate with the subscription survey app 512 to create a customer account for the first subscription service including receipt of payment information.

The user device 140 can also include additional data storage devices (removable and/or non-removable) such as, for example, magnetic disks, optical disks, or tape. Such additional storage is illustrated in FIG. 5 by removable storage 518 and non-removable storage 520. The removable storage 518 and non-removable storage 520 can store some, or all, of the functions 504, 506, 508, 512, 514 and the OS 510.

Non-transitory computer-readable media may include volatile and nonvolatile, removable and non-removable tangible, physical media implemented in technology for storage of information, such as computer readable instructions, data structures, program modules, or other data. The memory 502, removable storage 518, and non-removable storage 520 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the user device 140. Any such non-transitory computer-readable media may be part of the user device 140 or may be a separate database, databank, remote server, or cloud-based server.

In some implementations, the transceiver(s) 522 include any sort of transceivers known in the art. In some examples, the transceiver(s) 522 can include wireless modem(s) to facilitate wireless connectivity with the other user devices, the Internet, and/or an intranet via a cellular connection.

In other examples, the transceiver(s) 522 can include wired communication components, such as a wired modem or Ethernet port, for communicating with the other user devices or the provider's Internet-based network. In this case, the transceiver(s) 522 can also enable the user device 140 to communicate with the subscription service servers 120A-120n, the financial institution server 110, and the external server 130, as described herein.

In some implementations, the output device(s) 524 include any sort of output devices known in the art, such as a display (e.g., a liquid crystal or thin-film transistor (TFT) display), a touchscreen display, speakers, a vibrating mechanism, or a tactile feedback mechanism. In some examples, the output device(s) 524 can play various sounds based on, for example, whether the user device 140 is connected to a network, the type of call being received (e.g., video calls vs. voice calls), the number of active calls, etc. In some examples, the output device(s) can play a sound when the subscription service app 514 is successfully downloaded, when the customer account for the first subscription service is created, etc. Output device(s) 524 can also include ports for one or more peripheral devices, such as headphones, peripheral speakers, or a peripheral display.

In various implementations, input device(s) 526 can include any sort of input devices known in the art. The input device(s) 526 can include, for example, a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 6:
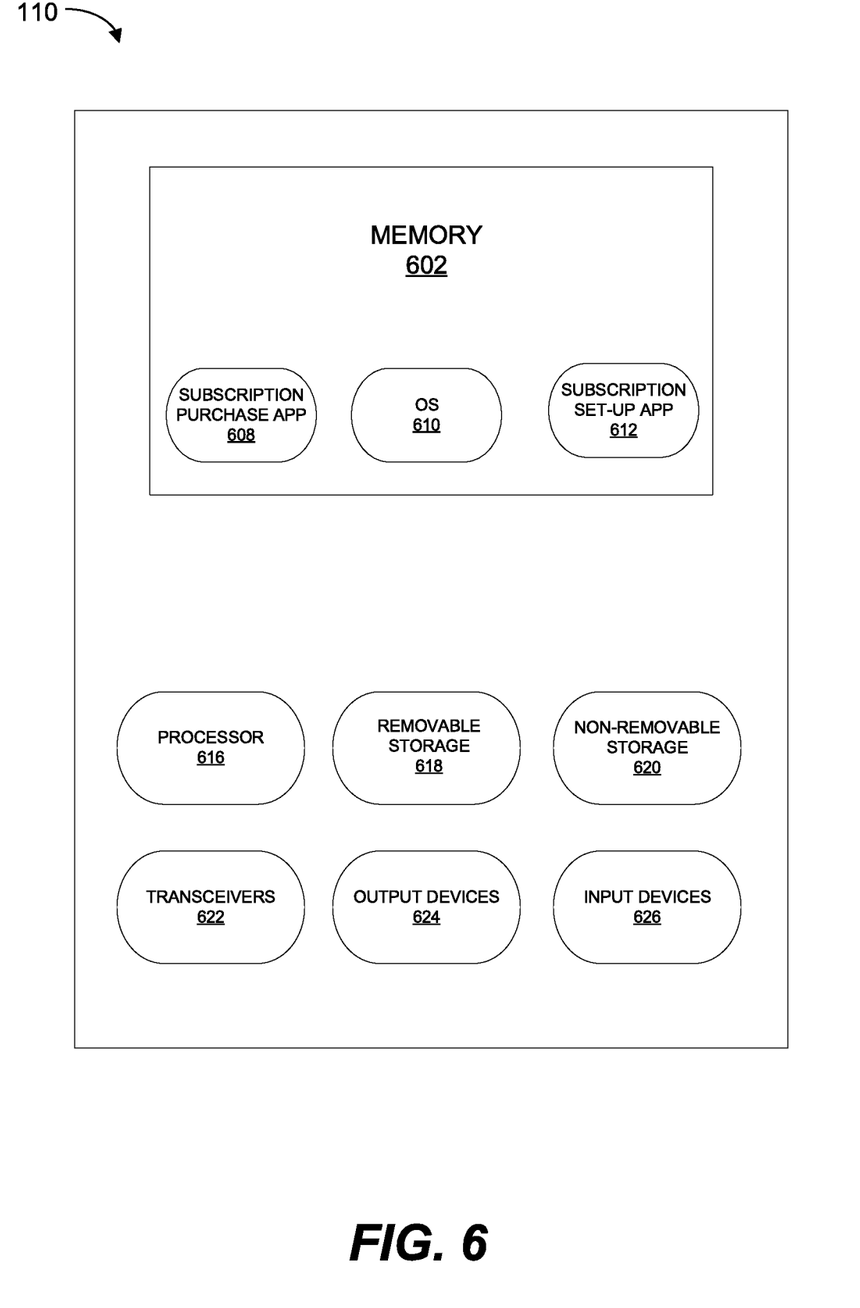
FIG. 6 is a component diagram of an example of a server, in accordance with some examples of the present disclosure.

As shown in FIG. 6, the system 100 and methods 200, 300 and 400 can also be used in conjunction with the financial institution server 110. The financial institution server 110 can comprise, for example, a desktop or laptop computer, a server, bank of servers, or cloud-based server bank. Thus, while the financial institution server 110 is depicted as single standalone servers, other configurations or existing components could be used.

In various implementations, the memory 602 can be volatile (such as random-access memory (RAM)), non-volatile (such as read only memory (ROM), flash memory, etc.), or some combination of the two. The memory 602 can include all, or part, of the functions of a subscription purchase app 608 and a subscription set-up app 612, among other things. The memory 602 may also include the OS 610. Of course, the OS 610 varies depending on the manufacturer of the financial institution server 110 and the type of component. Many servers, for example, run Linux or Windows Server. The OS 610 contains the modules and software that supports a computer's basic functions, such as scheduling tasks, executing applications, and controlling peripherals.

The financial institution server 110 can also comprise one or more processors 616, which can include a central processing unit (CPU), a graphics processing unit (GPU), or both CPU and GPU, or any other sort of processing unit. The subscription purchase app 608 can provide communication between the financial institution server 110 and the subscription service servers 120A-n, and the subscription set-up app 612 can provide communication between the financial institution server 110 and the user device 140. Thus, the subscription purchase app 608 can request details regarding products or services offered by the subscription service servers 120A-n including prices and features. Also, the subscription purchase app 608 can purchase subscription services (e.g., the first subscription service) from the subscription service servers 120A-n.

The subscription purchase app 608 can communicate with the subscription set-up app 612, for example, to notify the subscription set-up app 612 of the purchased subscription services that can be offered to users. The subscription set-up app 612 can send the offer for the first subscription service to the user device 140 and can receive acceptance of the offer from the user device 140. Then, the subscription set-up app 612 can communicate with one of the subscription service servers 120A-n to establish a customer account for the first subscription service and generate login information for the customer account. The subscription set-up app 612 can also encrypt the login information and send the login information to the user device 140.

The financial institution server 110 can also include additional data storage devices (removable and/or non-removable) such as, for example, magnetic disks, optical disks, or tape. Such additional storage is illustrated in FIG. 6 by removable storage 618 and non-removable storage 620. The removable storage 618 and non-removable storage 620 may store some, or all, of the OS 610 and functions 608.

Non-transitory computer-readable media may include volatile and nonvolatile, removable and non-removable tangible, physical media implemented in technology for storage of information, such as computer readable instructions, data structures, program modules, or other data. The memory 602, removable storage 618, and non-removable storage 620 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which may be used to store the desired information, and which can be accessed by the financial institution server 110. Any such non-transitory computer-readable media may be part of the financial institution server 110 or can be a separate database, databank, remote server, or cloud-based server.

In some implementations, the transceiver(s) 622 include any sort of transceivers known in the art. In some examples, the transceiver(s) 622 may include wireless modem(s) to facilitate wireless connectivity with the user device 140, the Internet, and/or an intranet via a cellular connection. Further, the transceiver(s) 622 can include a radio transceiver that performs the function of transmitting and receiving radio frequency communications via an antenna (e.g., Wi-Fi or Bluetooth®). In other examples, the transceiver(s) 622 can include wired communication components, such as a wired modem or Ethernet port, for communicating with the other user devices or the provider's Internet-based network. The transceiver(s) 622 can retrieve customer data from memory 602 and/or from the external server 130. Also, the transceiver(s) 622 send the login information to the user device 140.

In some implementations, the output device(s) 624 include any sort of output devices known in the art, such as a display (e.g., a liquid crystal or thin-film transistor (TFT) display), a touchscreen display, speakers, a vibrating mechanism, or a tactile feedback mechanism. In some examples, the output devices may play various sounds based on, for example, whether the financial institution server 110 is connected to a network, the type of data being received (e.g., customer data vs. merchant data), when the request is being transmitted, etc. Output device(s) 624 also include ports for one or more peripheral devices, such as headphones, peripheral speakers, or a peripheral display.

In various implementations, input device(s) 626 include any sort of input devices known in the art. For example, the input device(s) 626 can include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

The specific configurations, machines, and the size and shape of various elements can be varied according to particular design specifications or constraints requiring a user device 140, financial institution server 110, subscription service servers 120A-120n, external server 130, system 100, or method 200, 300, 400 constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

While certain examples of this disclosure have been described in connection with what is presently considered to be the most practical and various examples, it is to be understood that this disclosure is not to be limited to the disclosed examples, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain examples of the technology and also to enable any person skilled in the art to practice certain examples of this technology, including making and using any apparatuses or systems and performing any incorporated methods. The patentable scope of certain examples of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Cases

The following example use cases are practical examples of the devices and methods for subscription offerings described herein. It is intended solely for explanatory purposes and not to limit the disclosure in any way.

In one case, National Bank runs a new software program that searches through customer data to learn about subscription services purchased by its customers. National Bank determines that over 7,000 customers have a subscription with YouTubeTV®, i.e., they determine that over 7,000 National Bank customer accounts are charged a monthly fee of $49.99 from a merchant code associated with YouTubeTV®. National Bank recognizes that Hulu® offers the same channels as those included in the YouTubeTV® package at a price of $39.99 per month. National Bank estimates that at least 2,500 of its customers would switch from YouTubeTV® to Hulu® based on this price difference. As a result, National Bank negotiates to buy 2,500 subscriptions from Hulu® at an average of $34.99 per month.

National Bank then sends a message to its customers subscribed to YouTubeTV® offering a discounted rate of $36.99 per month. The message also illustrates the differences between the packages offered by YouTubeTV® and Hulu®. Thus, National Bank customers would save $13 per month when compared to their current YouTubeTV®, while National Bank would earn $2 per subscription. Next, National Bank receives an acceptance message from one of its customers, Christie. National Bank then retrieves Christie's first and last name from their customer database to set up an account with Hulu®. National Bank also automatically generates login information (i.e., without requiring any input from Christie) for the account and sends it to Christie. Accordingly, Christie can easily learn the differences between the subscription packages and can add a subscription service with minimal interaction.

In another case, Doug downloads the subscription saver app. The subscription saver app enables users to find the best subscription services at the best prices. At the time, Doug is a single guy with a few dating apps on his phone including Tinder® and Bumble®. Doug is a premium member of both dating apps, i.e., he pays a monthly subscription fee to each. The subscription saver app notices that both Tinder® and Bumble® are stored on Doug's phone and also that Doug pays a subscription fee to both. The subscription saver app generates a pop-up message that offers Doug a similar dating app called Hinge® at a lower cost than either Tinder® or Bumble®. Doug clicks 'yes" to allow the subscription saver app to download Hinge® and to set up an account. The subscription saver app downloads Hinge® from the app store then retrieves Doug's first and last name, city of residence, age, credit card number, and fingerprint data to send to Hinge® to automatically set up of an account including login information with his fingerprint. In some cases, the subscription saver app can also automatically delete Tinder® and/or Bumble®. Now, Doug can simply select Hinge® on his phone and use his thumbprint to access the Hinge® app.

What is claimed is:

1. A system for improved subscription offerings comprising:
    a financial institution server comprising:
        a financial institution processor;
        a first transceiver; and
        a first memory configured to store instructions to cause the financial institution processor to:
            retrieve, with the first transceiver, customer data including customer transactions for a plurality of customers;
            identify, by the financial institution processor, a first subscription service based at least in part on a merchant identifier included in the customer data;
            calculate, by the financial institution processor, a number of current subscriptions for the first subscription service;
            determine, by the financial institution processor, a number of bulk subscriptions for the first subscription service to purchase based on the number of current subscriptions;
            purchase, by the financial institution processor, the number of bulk subscriptions from a server of the first subscription service;
            identify, by the financial institution processor, a first customer to whom to offer the first subscription service by:
                identifying, by the financial institution processor, a first subscription type for the first subscription service,
                determining, by the financial institution processor, that the first customer has a subscription with a second subscription service of the first subscription type, and
                determining, by the financial institution processor, that the first customer does not have a subscription with the first subscription service;
            send, with the first transceiver, an offer for the first subscription service to a first user device associated with the first customer, the first user device comprising a device processor, a second transceiver, data storage storing a subscription survey application, and a second memory;
            receive, at the first transceiver, an acceptance of the offer from the first user device;
            retrieve, with the first transceiver, information for a first account for the first customer from the customer data;
            receive, by the financial institution processor, payment for the first subscription service from the first account;
            establish, by the financial institution processor, a first account for the first subscription service for the first customer with the server of the first subscription service;
            generate, by the financial institution processor, login information for the first account for the first subscription service of an online service; and
            send, by the first transceiver, the login information, for the first subscription service of an online service, to the first user device,
        wherein the second memory is configured to store instructions to cause the device processor to:
            scan, with the device processor and via the subscription survey application, the data storage of the first user device to identify a plurality of applications stored on the first user device, the plurality of applications corresponding to a plurality of service types;
            identify, with the device processor and via the subscription survey application, a first service type missing from the plurality of service types;
            determine, with the device processor, that a first customer is not subscribed to a third subscription service of the first service type from customer data; and
            automatically download, with the device processor and to the data storage, a second subscription service application associated with the third subscription service when the third subscription service is associated with the first service type.

2. The system of claim 1, wherein the instructions further cause the financial institution processor to:
    send, by the first transceiver, a clickable web link to the first user device that, when clicked, causes the first user device to download a first subscription application associated with the first subscription service.

3. The system of claim 1, wherein the instructions further cause the financial institution processor to:
    retrieve, with the first transceiver, historical customer data;
    identify, by the financial institution processor, the first subscription service based on the merchant identifier included in the historical customer data;
    calculate, by the financial institution processor, a number of previous subscriptions for the first subscription service; and
    compare, by the financial institution processor, the number of previous subscriptions to the number of current subscriptions to determine a growth rate of the first subscription service.

4. The system of claim 3, wherein determining the number of bulk subscriptions for the first subscription service is further based on the growth rate.

5. The system of claim 1, wherein the first subscription type comprises one of a utility service, a streaming television service, a dating service, or an internet provider service.

6. The system of claim 1, wherein sending the offer of the first subscription service further comprises:
    generating, by the financial institution processor, a graph that highlights the differences between the first subscription service and the second subscription service; and sending, by the financial institution processor, the graph to the first user device to cause the first user device to display the graph.

7. The system of claim 1, wherein sending the offer of the first subscription service further comprises:
   determining, by the financial institution processor, that a cost of the first subscription service is less than a cost of the second subscription service;
   determining, by the financial institution processor, a cost difference between the first subscription service and the second subscription service; and
   sending, by the financial institution processor, the cost difference to the first user device.

8. The system of claim 1, wherein the second memory is further configured to store instructions to cause the device processor to establish, with the device processor, a customer account with a server of a merchant associated with the second subscription service.

9. The system of claim 8, wherein the second memory is further configured to store instructions to cause the device processor to:
   generate, with the device processor, login information for the customer account of a second online service; and
   login, with the device processor, into the second subscription service using the login information.

10. The system of claim 1, wherein the second memory is further configured to store instructions to cause the device processor to:
    retrieve, with the device processor, payment information from the data storage on the first user device; and
    transmit, with the device processor, payment information to the second subscription service.

11. The system of claim 1, wherein the first memory is further configured to store instructions to cause the financial institution processor to:
    generate, with the financial institution processor, a graphical user interface (GUI) comprising a graph illustrating a comparison of the first subscription service to service features and prices for each of the bulk subscriptions;
    transmit, via the first transceiver, the graph to be displayed in the GUI operating on the first user device; and
    receive, from the first user device and via the GUI, the acceptance of the offer.

\* \* \* \* \*